United States Patent Office 3,845,044
Patented Oct. 29, 1974

3,845,044
AMINOALKYL DERIVATIVES OF 10H-PYRAZINO (2,3-b)(1,4)BENZOTHIAZINE
Yulan C. Tong, Walnut Creek, Calif., assignor to The Dow Chemical Company, Midland, Mich.
No Drawing. Filed Oct. 24, 1972, Ser. No. 299,884
Int. Cl. C07d 3/18
U.S. Cl. 260—243 AN          6 Claims

ABSTRACT OF THE DISCLOSURE

Tricyclic pyrazino compounds of the general formula

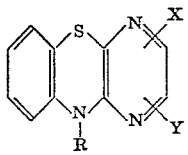

wherein either X and Y are H or Cl, or X is Cl and Y is —OCH$_3$; and R is a quaternized or unquaternized tertiary-aminoalkyl group, have been found to be useful as fungicides, herbicides and insecticides.

SUMMARY OF THE INVENTION

This invention is directed to novel tricyclic pyrazino compounds of the general formula

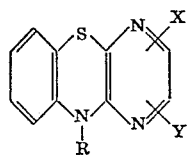

wherein, in the above formula, either X and Y are each H or Cl, or X is Cl and Y is —OCH$_3$; and R is a quaternized or unquaternized tertiary-aminoalkyl group, such as

—CH$_2$CH$_2$N(CH$_3$)$_2$, —CH$_2$CH$_2$CH$_2$N(CH$_3$)$_2$,

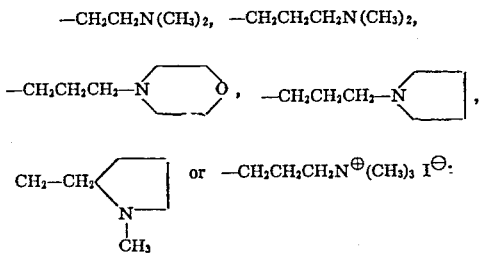

The compounds of this invention vary from dark oils to orange or yellow crystals or powders. They generally are only slightly soluble in water, and are fairly soluble in common organic solvents. They have been found to have biological utility, particularly as fungicides, herbicides and insecticides.

DETAILED DESCRIPTION OF INVENTION

The tricyclic pyrazino compounds of the present invention are prepared in a sequence of several reactions. A vicinal dihalopyrazine is condensed, in a two-step reaction, with ortho amonbenzenethiol. A tertiary-aminoalkyl group is then introduced on the ring nitrogen (10-position in the condensation product), said group being derived from the ortho amino group. If tetrachloropyrazine is employed as the vicinal dihalopyrazine reactant, the N-(aminoalkylated) condensation product will have chlorine substituents in the 2 and 3 positions and one of these chlorines can be replaced by methoxide. Optionally, the amino portion of the aminoalkyl substitutent in any of the compounds of the invention can be quaternized by reaction with an alkyl halide.

Condensation

The condensation reaction can be represented thus:

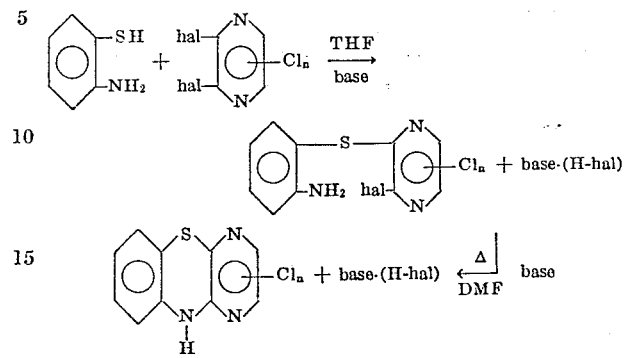

$n$ being 0 or 2 and hal is —Cl or —Br (same in both occurrences) depending on $n$. If $n=0$, hal is either Cl or Br. When $n$ is 2, hal must be Cl.

Equimolar amounts of the reactants are contacted in an inert solvent, at room temperature and in the presence of a tertiary amine, until precipitation of the amine hydrohalide essentially ceases. The liquid phase is then separated and carefully evaporated to dryness. The residual intermediate product is mixed with dimethyl formamide and the mixture refluxed (at atmospheric pressure) for one or two hours. The reaction mixture is then cooled, mixed with ice water and the final condensation product recovered as a solid phase. After being washed with a solvent, such as methanol, this product is generally suitable for the next reaction without recrystallization.

Suitable solvents for the initial step of the condensation are inert liquids in which the reactants are soluble and in which the hydrohalide by-product is preferably insoluble. Ethers, such as tetrahydrofuran (THF) or 1,2-dimethoxyethane (glyme), are preferred. The intial phase of the condensation is carried out at or below room temperature to ensure that undesired side reactions do not occur.

Suitable dihalopyrazine reactants which may be employed in the condensation reaction are 2,3-dichloropyrazine, 2,3-dibromopyrazine and tetrachloropyrazine.

N-(aminoalkylation)

The aminoalkylation reaction can be represented as follows:

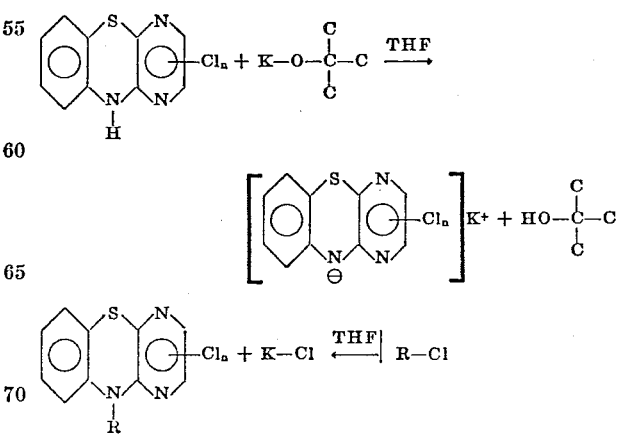

with R being a tertiary-aminoalkyl group, selected from

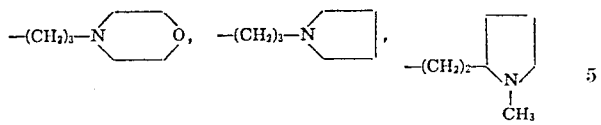

or —(CH₂)₃N(CH₃)₂.

The tricyclic condensation product is first reacted with one equivalent of potassium t-butoxide in an inert solvent, such as tetrahydrofuran, to form an anion which imparts a characteristic red color to the solution. The t-aminoalkyl chloride is then introduced and the mixture is refluxed (at atmospheric pressure) until the red color disappears.

After separation from the potassium chloride, the liquid phase is stripped and the resulting residual crude product purified by distillation or recrystallization.

If desired, the t-aminoalkyl chloride can be formed *in situ* upon introduction to the reaction mixture—together with another equivalent of butoxide—as a hydrohalide salt.

Replacement

The replacement reaction may be depicted as follows:

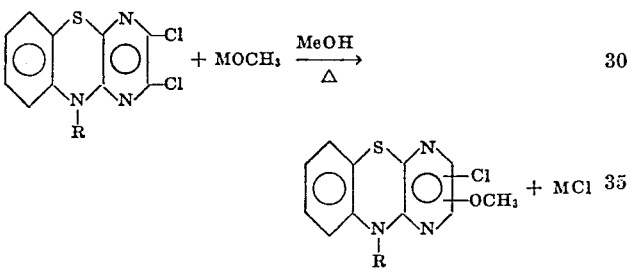

M being Na or K.

At least enough sodium (or potassium) is dissolved in anhydrous methanol to provide an equivalent of methoxide ion and the aminoalkylated condensation product is then added. The mixture is refluxed until metal chloride precipitation is essentially complete. The liquid phase is separated and stripped. The resulting residue of crude product is preferably recrystallized.

PREFERRED EMBODIMENTS

I. 10H-Pyrazino(2,3-b)(1,4)benzothiazine

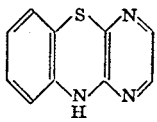

In a flask were placed 18.3 g. (0.123 mole) of 2,3-dichloropyrazine, 15.45 g. (0.123 mole) of 2-amino-benzenethiol and 200 ml. of tetrahydrofuran (THF). While being maintained at 20–30° C. with cooling, 13.7 g. (0.135 mole) of triethylamine was added dropwise. After the addition, the cooling bath was removed and the reaction mixture stirred at room temperature for 6 hours. The triethylamine hydrochloride was removed by filtration and the filtrate concentrated on a steambath. The residue was dissolved in 275 ml. of dimethylformamide (DMF) and heated to boiling under reflux for 1.5 hours. After cooling, the reaction mixture was poured into 1.5 kg. of ice and filtered. The solid was slurried in 600 ml. of methanol and filtered to give 17.25 g. of 10H-pyrazino(2,3-b)(1,4)benzothiazine, m.p, 179–81°. Recrystallization from dichloromethane-hexane resulted in a product with a melting point of 187–9° C. Analysis confirmed the above structure II. 10-(2-(Dimethylamino)ethyl)-10H-pyrazino(2,3-b)(1,4)-benzothiazine

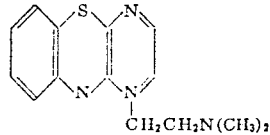

Ten grams (0.05 mole) of 10H-pyrazino(2,3-b)(1,4) benzothiazine was placed in 60 ml. of THF. To this was added 7.9 g. (0.07 mole) of potassium t-butoxide in 60 ml. of THF. The whole was heated to boiling under reflux for 15 minutes. 2 - Chloro - N,N - dimethyl-ethylamine in 50 ml. of THF was added and the whole heated to boiling under reflux overnight. After cooling, the reaction mixture was poured into 2 l. of water and filtered. From the solid was recovered 2.8 g. of starting material. The filtrate was extracted with dichloromethane, the solution concentrated and the residue distilled under reduced pressure to give 3 g. (31%) of 10 - (2 - (dimethylamino)-ethyl) - 10H - pyrazino(2,3-b)(1,4)pyrazine, b.p. 183°/0.2 mm.

III. 2,3 - Dichloro - 10 - (2-dimethylaminoethyl)-10H-pyrazino(2,3-b)(1,4)pyrazine

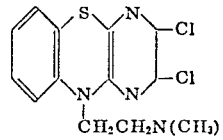

5.2 g. (0.0192 mole) of 2,3 - dichloro - 10H - pyrazino-(2,3-b)(1,4)benzothiazine was mixed with 40 ml. of dimethoxyethane and 2.2 g. of potassium t-butoxide. 2-Chloro - N,N - dimethylethylamine hydrochloride (3.5 g. 0.024 mole) was neutralized with 2.7 g. of potassium t-butoxide in 25 ml. of dimethoxyethane and added to the reaction mixture, which was then heated to 86° for 2.5 hrs., poured into water and filtered. Recrystallization from hexane gave 4.5 g. (69%) of the title compound, m.p. 99–101°. Analysis confirmed the structure.

IV. 2,3 - Dichloro - 10 - (3 - dimethylaminopropyl)-10H-pyrazino(2,3-b)(1,4)benzothiazine

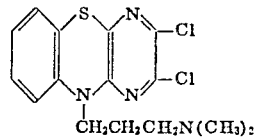

A commercial sample of 3-chloro-N,N-dimethyl-propylamine hydrochloride was dissolved in water and covered with ether. With cooling and stirring K₂CO₃ was added in small portions until the aqueous layer became strongly alkaline. The ether solution was separated, dried and concentrated. The 3 - chloro - N,N-dimethyl-propylamine so obtained was stored in cold for future use.

2,3 - Dichloro - 10H - pyrazino(2,3-b)(1,4)benzothiazine, 13.5 g. (0.05 mole) was alkylated with 10.9 g. (0.09 mole) of 3 - chloro - N,N - dimethylpropylamine in the presence of 7.9 g. (0.07 mole) of potassium t-butoxide in 150 ml. of THF according to the procedure in II. Recrystallization from CHCl₃ isopropyl alcohol gave 6.7 g. (38%) of the titled compound, m.p. 70–1°.

V. 2,3-Dichloro-10-(3-N-morpholinopropyl)-10H-pyrazino(2,3-b)(1,4)benzothiazine

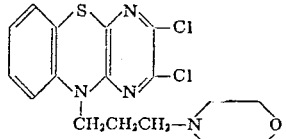

Using the same procedure as reported in II, 27.0 g. (0.1 mole) of 2,3 - dichloro - 10H - pyrazino(2,3-b)(1,4)

benzothiazine in 120 ml. of THF was converted into the anion in the presence of 15.8 g. (0.1 mole) of the potassium salt of t-butyl alcohol in 120 ml. of THF and alkylated with 32.7 g. (0.2 mole) of N-(3-chloropropyl)-morpholine in 60 ml. of THF to give 17.5 g. (44%) of the titled compound, m.p. 107–9°, from hexane.

VI. 2,3 - Dichloro - 10 - (3 - N - pyrrolidinylpropyl)-10H-pyrazino(2,3-b)(1,4)benzothiazine

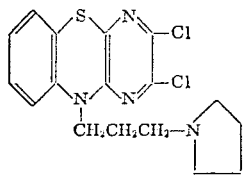

Using the procedure reported in II, 13.5 g. (0.05 mole) of 2,3 - dichloro - 10H - pyrazino(2,3-b(1,4)benzothiazine in 60 ml. of THF was converted into the anion in the presence of 7.9 g. (0.07 mole) of the potassium salt of t-buytl alcohol in 50 ml. of THF, and alkylated with 14.8 g. (0.1 mole) of N - (3 - chloropropyl)-pyrrolidine in 40 ml. of THF to give 7.8 g. (41%) of the titled compound, m.p. 62–3°, from hexane.

VII 10 - (3 - (1 - Pyrrolidinyl)propyl)-10H-pyrazino-(2,3-b)(1,4)benzothiazine

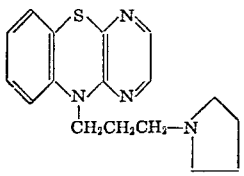

Using the procedure in II, 10.06 g. (0.05 mole) of 10H - pyrazino(2,3-b)(1,4)benzothiazine in 60 ml. of THF was converted into the anion in the presence of 7.9 g. (0.07 mole) of the potassium salt of t-butyl alcohol in 60 ml. of THF and then alkylated with 14.8 g. (0.1 mole) of N - (3 - chloropropyl)-pyrrolidine in 40 ml. of THF. After distillation, 4.4 g. (28%) of the titled compound, b.p. 180–90°/0.2 mm., was obtained.

VIII. 2,3-Dichloro-10-(2-(1-methyl)pyrrolidinylethyl)-10H-pyrazino(2,3-b)(1,4)benzothiazine

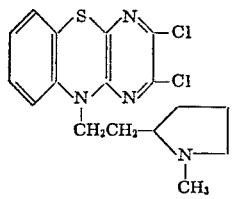

Using the same procedure as reported in II, 13.5 g. (0.05 mole) of 2,3 - dichloro - 10H - pyrazino(2,3-b)(1,4) benzothiazine in 60 ml. of THF was converted into its anion in the presence of 7.9 g. (0.07 mole) of the potassium salt of t-butyl alcohol in 60 ml. of THF. 2-(2-Chloroethyl) - 1 - methylpyrrolidine was obtained from 11.1 g. (0.06 mole) of its hydrochloride after neutralization with 7.9 g. (0.07 mole) of the above potassium salt in 60 ml. of THF was used to alkylate the anion. After repeated crystallization from hexane, 2.8 g. (15%) of the titled compound was obtained, m.p. 81–3°.

IX. 2(ORO 3)-Chloro-3(OR 2)-methoxy-10-(3-morpholinopropyl)-10H-pyrazino(2,3-b)(1,4)benzothiazine

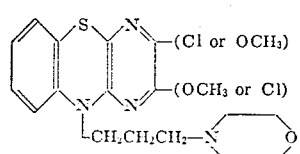

In 100 ml. of methanol was dissolved 1.38 g. (30 mg.-atom) of 50% sodium dispersion. The sodium methoxide solution was then added to 9.93 g. (25 mmole) of 2,3-dichloro - 10 - (3-morpholinopropyl) - 10H - pyrazino (2,3-b)(1,4)benzothiazine. The whole was heated to boiling under reflux for 6 hours. The solvent was then removed and residue recrystallized from dichloromethanehexane to give 5.7 g. (58%) of the titled compound, m.p. 117–8°.

X. 2(OR 3)-Chloro - 10 - (3-(dimethylamino)propyl)-3-(OR 2)-methoxy-10H-pyrazino(2,3-b)(1,4)benzothiazine

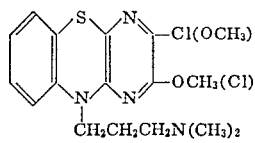

Using the procedure given in IX, 0.92 g. (20 mg.-atom) of 50% sodium dispersion in 100 ml. of methanol was caused to react with 6.5 g. (18.3 mmole) of 2,3-dichloro-10-(3-N,N-dimethylaminopropyl) - 10H - pyrazino(2,3-b) (1,4)benzothiazine. After removal of solvent, the residue was recrystallized hexane to give 2.6 g. (40%) of the titled compound, m.p. 81.5–2°.

XI. (3-(2,3-Dichloro-10H-pyrazino(2,3-b)(1,4)benzothiazin-10-YL)propyl)-trimethyl-ammonium Iodide

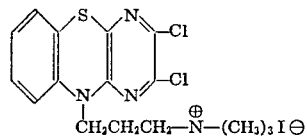

In 20 ml. of CHCl$_3$ were mixed 2 ml. of methyl iodide and 2 g. (5.6 mmole) of 2,3-dichloro-10-(3-(dimethylamino)propyl) - 10H - pyrazino(2,3-b)(1,4) - benzothiazine. A precipitate came out collected by filtration. The solid was boiled in methanol and filtered to give 2.6 g. (93%) of the titled compound, m.p. 241–2°.

BIOLOGICAL UTILITY

The tricyclic pyrazino compounds of the present invention are useful as pesticides and have particular utility as fungicides and insecticides. In such applications the pest to be controlled is contacted with a pesticidal amount of one or more of the compounds of the invention.

For all such uses the present pyrazino compounds can be employed in an unmodified form or they can be dispersed on a finely divided solid and employed as dust or dispersed in water with or without the aid of a surface active agent and the resulting aqueous suspensions employed as drenches or sprays. In other procedures, the products are employed as active constituents in solvent solutions, in oil-in-water or water-in-oil emulsions, or in aqueous dispersions. All such ingredients and adjuvants cooperate with the active component so as to facilitate the invention and obtain an improved and outstanding result.

The foregoing augmented compositions are adapted to be formulated as liquid or solid concentrates and subsequently diluted with additional liquid or solid adjuvants to produce the ultimate treating composition. Suitable emulsifiable liquid concentrates are formulations of the active pyrazino compound in a suitable organic solvent therefor such as alcohols, alkyl ethers of glycols and polyglycols, ketones, aromatics and petroleum distillates, together with an ionic or non-ionic emulsifying agent or a mixture thereof. Such emulsions are preferably designated such that they are self-dispersing with good stability characteristics. The dusts and dust concentrates can be prepared by dispersing the active toxicant compounds in and on a finely divided inert solid support such as diatomaceous earth, bentonite, fuller's earth, attapulgite and similar clays. For the preparation of wettable powders, the solid carrier may be mechanically ground in admixture with the active component hereof and a surface active dispersing agent.

Any of the foregoing compositions can be distributed so as to contact pests with a pesticidal amount of one or more of the active compounds. This amount depends largely upon the manner of distribution, the type of pest being treated and its extent or severity of development and the degree of control desired or required for any particular purpose. Generally, the effective or pesticidal dosage ranges from 1 to 10,000 or more parts of toxicant per million parts of applied composition. For the control of fungal organisms, the active compounds usually are applied to growth media of said organisms in amounts to provide from about 10 or less to about 5000 or more parts by weight of the active substituted pyrazino compound per million parts of the ultimate treating composition.

The exact concentration of the active component to be employed in the treating composition is not critical and may vary considerably provided the required dosage of the effective agent is applied to the growth medium or other body being treated.

In a representative operation, 2,3-dichloro-10-(3-dimethylaminopropyl) - 10H - pyrazino(2,3-b)(1,4)benzothiazine was dispersed in warm melted nutrient agar which was then poured into petri dishes and allowed to solidify, the aforesaid compound being utilized in an amount such as to provide different concentrations ranging from 10 to 500 p.p.m. of the finished agar. The surface of the agar was then inoculated with a variety of fungal pest organisms, and the inoculated plates incubated under suitable conditions. Similar check plates, which were not treated with pyrazino compounds, were also inoculated and incubated. It was found that the above compound gave 100% control of the following fungi at 100 p.p.m.: *Staphyloccus aureus, Candida albicans, Trichophtan mentagraphytes, Bacillus subtilis, Aspergillus, terreus, Candida pelliculosa* and *Pullularia pullulans*. The following analogs of the above pyrazino compound gave similar control at about the same concentration: 2,3-dichloro-10-(3-N-pyrrolidinylpropyl); and 2,3-dichloro-10-(2-(1-methyl)pyrrolidinylethyl).

In a method similar to the above, the following analogs showed 100% control of the above fungal pests at about the 500 p.p.m. concentration level: 2,3-dichloro-10-(2-dimethylamino)-ethyl); 2(or 3)-chloro-3(or 2)methoxy-10-(3-dimethylamino)propyl); 2(or 3)-chloro-3(or 2) methoxy-10-(3-morpholinopropyl); 10-(3-(1-pyrrolidinyl)propyl); and 10-(2-dimethylamino)ethyl). Other unnamed compositions of this invention also have been found active as fungicides at concentrations of from 100 to 500 p.p.m. Further, they were found to be active in the control of the southern armyworm at the 500 p.p.m. level, while also being effective against the yellow fever mosquito adult at levels ranging from 5 to 10 p.p.m.

In other typical applications, they were found effective as herbicides, particularly pig weed at the 10 p.p.m. level.

I claim:

1. Tricyclic pyrazino compound of the formula

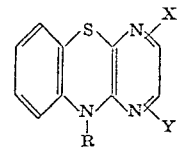

wherein either (a) X and Y are each Cl, or (b) X is Cl and Y is —OCH₃; and R is a quaternized or unquaternized tertiaryaminoalkyl radical selected from the group:

—CH₂CH₂N(CH₃)₂, —CH₂CH₂CH₂N(CH₃)₂,

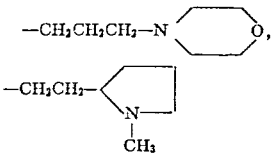

or

—CH₂CH₂CH₂N⊕(CH₃)₃ I⊖.

2. 2,3-Dichloro-10 - (3 - N - morpholinylpropyl)-10H-pyrazino(2,3-b)(1,4)benzothiazine.

3. 2,3-Dichloro-10-(2-(1 - methyl)pyrrolidinyl)ethyl)-10H-pyrazino(2,3-b)(1,4)benzothiazine.

4. 2(or 3) - Chloro - 3(or 2) - methoxy - 10 - (3-N-morpholinylpropyl)-10H-pyrazino(2,3-b)(1,4)benzothiazine.

5. 2(or 3)-Chloro-10-(3-dimethylaminopropyl)-3(or 2) methoxy-10H-pyrazino(2,3-b)(1,4)benzothiazine.

6. (3-(2,3-Dichloro-10H - pyrazino(2,3-b)(1,4)benzothiazin-10-YL)propyl)-trimethyl-ammonium iodide.

References Cited
UNITED STATES PATENTS
2,943,086  6/1960  Yale et al. _____ 260—243
FOREIGN PATENTS
1,406,765  6/1965  France _____ 260—243

HARRY I. MOATZ, Primary Examiner

U.S. Cl. X.R.
424—247, 71—90

PO-1050
(5/69)

UNITED STATES PATENT OFFICE
CERTIFICATE OF CORRECTION

Patent No. 3,845,044            Dated October 29, 1974

Inventor(s) Y. C. Tong

It is certified that error appears in the above-identified patent and that said Letters Patent are hereby corrected as shown below:

Column 1, line 61, word after "ortho" should be: aminobenzenethiol.

Column 4, line 5 formula should be:

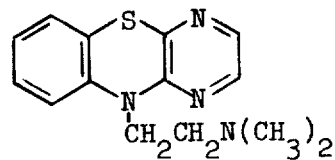

Column 4, line 23 should read:

-- III. 2,3-Dichloro-10-(2,dimethylamino)ethyl)-10H- -- .

Column 5, line 66 should read:

-- IX. 2(or 3)-Chloro-3(or 2)-methoxy-10-(3-morpho- --.

Signed and sealed this 14th day of January 1975.

(SEAL)
Attest:

McCOY M. GIBSON JR.
Attesting Officer

C. MARSHALL DANN
Commissioner of Patents